(12) United States Patent
Kojo et al.

(10) Patent No.: US 10,391,573 B2
(45) Date of Patent: Aug. 27, 2019

(54) METHOD OF CUTTING AND REMOVING ADHESIVE MATTER AT END OF CUBOID METAL MATERIAL AND REMOVAL APPARATUS

(71) Applicant: JFE Steel Corporation, Tokyo (JP)

(72) Inventors: Rinya Kojo, Kurashiki (JP); Satoshi Oro, Fukuyama (JP); Hiromasa Hayashi, Kawasaki (JP); Yohei Takanaga, Kawasaki (JP); Atsushi Yamamoto, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 0 days.

(21) Appl. No.: 14/392,254

(22) PCT Filed: Jun. 23, 2014

(86) PCT No.: PCT/JP2014/003336
§ 371 (c)(1),
(2) Date: Dec. 24, 2015

(87) PCT Pub. No.: WO2014/208069
PCT Pub. Date: Dec. 31, 2014

(65) Prior Publication Data
US 2016/0167149 A1    Jun. 16, 2016

(30) Foreign Application Priority Data
Jun. 27, 2013 (JP) .................................. 2013-134722

(51) Int. Cl.
*B23K 7/06* (2006.01)
*B22D 11/126* (2006.01)
(Continued)

(52) U.S. Cl.
CPC .............. *B23K 7/06* (2013.01); *B22D 11/126* (2013.01); *B22D 11/16* (2013.01); *B23K 7/102* (2013.01)

(58) Field of Classification Search
CPC ........................................................ B23K 7/06
(Continued)

(56) References Cited

U.S. PATENT DOCUMENTS 3,365,773 A * 1/1968 Olsen ...................... B23B 5/167
                                                        407/49
4,032,251 A * 6/1977 Ribich .................... B23B 51/10
                                                        408/199

(Continued)

FOREIGN PATENT DOCUMENTS

JP        57-160860 U      10/1982
JP        2-124250 A       5/1990
(Continued)

OTHER PUBLICATIONS

Supplementary European Search Report dated Jun. 20, 2016, of corresponding European Application No. 14816635.8.
(Continued)

*Primary Examiner* — Scott R Kastler
(74) *Attorney, Agent, or Firm* — DLA Piper LLP (US)

(57) ABSTRACT

Adhesive matter remaining at the end of a cuboid metal material is reliably removed in a relatively short time while suppressing the decrease in yield rate of the metal material. Distances of the upper surface and the lower surface of a cuboid metal material from a reference position are measured using a distance measurement device in the longitudinal direction of the slab including the longitudinal end of the slab. On the basis of the measurement results, the state of remaining of adhesive matter remaining on the upper and lower surfaces of the longitudinal end of the slab is com- (Continued)

prehended. On the basis of the state of remaining of adhesive matter, the amount and position of cutting by a cutting tool is determined. Corner removing cutting is performed on the upper and lower surfaces of the longitudinal end of the slab using the cutting tool in accordance with the determined amount and position of cutting.

8 Claims, 5 Drawing Sheets

(51) Int. Cl.
 *B22D 11/16* (2006.01)
 *B23K 7/10* (2006.01)
(58) Field of Classification Search
 USPC .................. 266/49; 409/297, 298, 300, 301; 148/195
 See application file for complete search history.

(56) References Cited

U.S. PATENT DOCUMENTS

| | | | | |
|---|---|---|---|---|
| 4,126,491 A | * | 11/1978 | Karlsson | B23P 6/04 148/195 |
| 4,175,729 A | * | 11/1979 | Karlsson | G01N 27/9093 148/195 |
| 2016/0167149 A1 | * | 6/2016 | Kojo | B22D 11/126 148/195 |

FOREIGN PATENT DOCUMENTS

| | | |
|---|---|---|
| JP | 4-283064 A | 10/1992 |
| JP | 7-185756 A | 7/1995 |
| JP | 8-141714 A | 6/1996 |
| JP | 11-57960 A | 3/1999 |
| JP | 2003-154443 A | 5/2003 |
| JP | 2004-148365 A | 5/2004 |
| JP | 2008-264986 | 11/2008 |
| JP | 2009-45636 A | 3/2009 |
| JP | 2009-226486 | 10/2009 |
| JP | 2013-027883 | 2/2013 |
| KR | 2003-0016810 | 3/2003 |
| KR | 10-2013-0002505 | 1/2013 |

OTHER PUBLICATIONS

Chinese Office Action dated Sep. 26, 2016, of corresponding Chinese Application No. 201480036247.7, along with a Search Report in English.
Korean Office Action dated Nov. 1, 2017, of corresponding Korean Application No. 2016-7001042, along with a Concise Statement of Relevance of Office Action in English.
Korean Office Action dated May 8, 2017, of corresponding Korean Application No. 2016-7001042, along with a Concise Statement of Relevance of Office Action in English.
Korean Office Action dated Feb. 8, 2018, of corresponding Korean Application No. 2016-7001042, along with a Concise Statement of Relevance of Office Action in English.
European Office Action dated Feb. 15, 2019, of counterpart European Application No. 14816635.8.

* cited by examiner

METHOD OF CUTTING AND REMOVING ADHESIVE MATTER AT END OF CUBOID METAL MATERIAL AND REMOVAL APPARATUS

TECHNICAL FIELD

This disclosure relates to a technique of cutting and removing adhesive matter such as scarfing slag remaining at the end of a cuboid metal material such as a slab or a square billet manufactured by continuous casting.

BACKGROUND

A cast slab manufactured by continuous casting is cut into slabs having a predetermined length by oxygen cutting. At that time, a part of slab melts owing to oxygen cutting, and adhesive matter called "scarfing slag" thereby often adheres to the upper and lower ends of the longitudinal end of the slab. Scarfing processing is sometimes performed to remove surface defects of the slab. Owing to scarf processing, icicle-like adhesive matter, called "fins" of steel melted by scarf processing is generated on the slab. If hot rolling is performed with adhesive matter such as scarfing slag and fins adhering to the longitudinal end (hereinafter also sometimes simply referred to as the end) of the slab, small scratches are generated on the surface of the steel sheet owing to the adhesive matter during rolling even if the adhesive matter is small. So, techniques to remove the above-described adhesive matter prior to hot rolling have been proposed.

For example, Japanese Unexamined Patent Application Publication No. 4-283064 discloses a technique of grinding and removing scarfing slag adhering to the lower edge of the cut surface of a slab using a whetstone. Japanese Unexamined Patent Application Publication No. 8-141714 discloses a technique of mechanically removing scarfing slag adhering to the lower part of the end face of a slab using a swinging blade.

Japanese Unexamined Patent Application Publication No. 2009-45636 discloses a technique of grinding and removing a corner part in the width direction of a slab using position coordinate data of an edge part of the slab obtained by measuring the shape of the slab, although the part that is processed is not the longitudinal end face of the slab.

In the grinding and removing using a whetstone described in Japanese Unexamined Patent Application Publication No. 4-283064, the processing capacity of a grinder that performs grinding is relatively small. Therefore, when grinding the slab end face having a large area as an object of processing, a considerable grinding time is required. In addition, new grinding burrs or the like may be generated due to grinding, and multiple grinding operations need to be performed separately to remove the new burrs or the like. Therefore, the slab end face grinding operation as a whole requires a long processing time. Thus, to match the pace of the grinding operation with the production pace of slabs in a typical continuous casting equipment, a plurality of grinders need to be disposed on the transfer line that conveys continuously cast slabs. Therefore, when applying the technique disclosed in Japanese Unexamined Patent Application Publication No. 4-283064, configuration of the transfer line is complicated, and the acquisition and maintenance costs of grinders are increased.

On the other hand, the technique of Japanese Unexamined Patent Application Publication No. 8-141714 can remove burrs remaining on the lower surface of a slab. However, burrs and fins remaining on parts other than the lower surface, that is, the central part in the thickness direction and the upper corner part of the cut surface of the slab cannot be removed. In view of the decrease in yield rate due to the cutting and removing of the corner part, it is preferable to change the size of the corner part that is cut and removed depending on the size of the burr. However, such a point is not considered in Japanese Unexamined Patent Application Publication No. 8-141714.

The technique of Japanese Unexamined Patent Application Publication No. 2009-45636 detects the shape of a slab using a laser distance meter, and detects and corrects the abnormal value of distance data using optical inspection equipment. However, as shown in FIG. 6 of Japanese Unexamined Patent Application Publication No. 2009-45636, only a method of detecting the position of an edge part of a slab substantially rectangular is shown. In Japanese Unexamined Patent Application Publication No. 2009-45636, a method of determining the end position of the base iron part of a slab to which adhesive matter is adhering and the size of the adhesive matter is not shown, and the technique of Japanese Unexamined Patent Application Publication No. 2009-45636 cannot be applied to the removal of adhesive matter on the slab end face.

It could therefore be helpful to provide a method and a removal apparatus for cutting and removing adhesive matter at the end of a cuboid metal material that can reliably remove adhesive matter such as scarfing slag remaining at the end of a cuboid metal material such as a slab or a square billet in a relatively short time while suppressing the decrease in yield rate of the metal material.

SUMMARY

We provide an adhesive matter cutting and removing method of the end of a cuboid metal material which is an adhesive matter cutting and removing method that removes adhesive matter remaining on the upper and lower surfaces of the longitudinal end of a cuboid metal material by corner removing cutting, comprising measuring distances of the upper surface and the lower surface of the cuboid metal material from a reference position using a distance measurement means in the longitudinal direction of the cuboid metal material including the longitudinal end of the cuboid metal material, comprehending on the basis of the measurement results the state of remaining of adhesive matter remaining on the upper and lower surfaces of the longitudinal end of the cuboid metal material, determining on the basis of the state of remaining of adhesive matter the amount and position of cutting by a cutting tool, and performing corner removing cutting on the upper and lower surfaces of the longitudinal end of the cuboid metal material using the cutting tool in accordance with the determined amount and position of cutting.

In the above adhesive matter cutting and removing method of the end of a cuboid metal material, comprehending the state of remaining of the adhesive matter may be performed by determining a reference line of the upper surface and the lower surface of the cuboid metal material on the basis of distribution of distance of the upper surface and the lower surface of the cuboid metal material from the reference position measured over a predetermined length or more in the longitudinal direction of the cuboid metal material, then determining a corner position of the cuboid metal material from this reference line and the distribution of distance, and determining a position at which the distance is smaller than the distance from the reference line by a predetermined value or more to be a place where adhesive matter remains, and the amount and position of cutting by the cutting tool are determined on the basis of the distance of the place where adhesive matter remains from the end of the cuboid metal material and the determined corner position.

In either of the above adhesive matter cutting and removing methods of the end of a cuboid metal material, the cuboid metal material may be divided in the width direction into a plurality of sections, for each of the plurality of sections, distances of the upper surface and the lower surface thereof from a reference position are measured using a distance measurement means in the longitudinal direction thereof including the end thereof, on the basis of the measurement results, for each of the plurality of sections, the state of remaining of adhesive matter remaining on the upper and lower surfaces of the longitudinal end of the cuboid metal material is comprehended, and on the basis of the state of remaining of adhesive matter of each of the plurality of sections, the amount and position of cutting by a cutting tool of each of the plurality of sections are determined.

An adhesive matter cutting and removing apparatus that removes adhesive matter of the end of a cuboid metal material is an adhesive matter cutting and removing apparatus that removes adhesive matter remaining on the upper and lower surfaces of the longitudinal end of a cuboid metal material by corner removing cutting, comprising a cutting tool that performs corner removing cutting on the upper and lower surfaces of the longitudinal end of the cuboid metal material, a distance measurement means that measures distances of the upper surface and the lower surface of the cuboid metal material from a reference position, and a control means that causes the distance measurement means to measure distances of the upper surface and the lower surface of the cuboid metal material from a reference position in the longitudinal direction of the cuboid metal material including the longitudinal end of the cuboid metal material, comprehends on the basis of the measurement results the state of remaining of adhesive matter remaining on the upper and lower surfaces of the longitudinal end of the cuboid metal material, determines on the basis of the state of remaining of adhesive matter the amount and position of cutting by a cutting tool, and causes the cutting tool to perform corner removing cutting on the upper and lower surfaces of the longitudinal end of the cuboid metal material in accordance with the determined amount and position of cutting.

In the above adhesive matter cutting and removing apparatus that removes adhesive matter of the end of a cuboid metal material, the control means may comprehend the state of remaining of the adhesive matter by determining a reference line of the upper surface and the lower surface of the cuboid metal material on the basis of distribution of distance of the upper surface and the lower surface of the cuboid metal material from the reference position measured over a predetermined length or more in the longitudinal direction of the cuboid metal material, then determining a corner position of the cuboid metal material from this reference line and the distribution of distance, and determining a position at which the distance is smaller than the distance from the reference line by a predetermined value or more to be a place where adhesive matter remains, and determines the amount and position of cutting by the cutting tool on the basis of the distance of the place where adhesive matter remains from the end of the cuboid metal material and the corner position.

In either of the above adhesive matter cutting and removing apparatuses for the end of a cuboid metal material, the control means may divide the cuboid metal material in the width direction into a plurality of sections, may cause the distance measurement means to measure, for each of the plurality of sections, distances of the upper surface and the lower surface thereof from a reference position in the longitudinal direction thereof including the end thereof, may comprehend, on the basis of the measurement results, for each of the plurality of sections, the state of remaining of adhesive matter remaining on the upper and lower surfaces of the longitudinal end of the cuboid metal material, and may determine, on the basis of the state of remaining of adhesive matter of each of the plurality of sections, the amount and position of cutting by a cutting tool of each of the plurality of sections.

Our methods comprehend the state of adhesion of adhesive matter remaining on the upper and lower surfaces of the longitudinal end of a cuboid metal material, determine, on the basis of the state of remaining of adhesive matter, the amount and position of cutting, and perform corner removing cutting on the upper and lower surfaces of the longitudinal end of the cuboid metal material using a cutting tool in accordance with the determined amount and position of cutting. Therefore, the decrease in yield rate due to excessive cutting and the remaining of adhesive matter due to inadequate cutting can be avoided. In addition, the tool life is lengthened due to controlling the amount of cutting. Further, since the upper and lower surfaces of the longitudinal end of the cuboid metal material are removed by corner removing cutting, which has a large processing capacity, adhesive matter remaining at the end of the cuboid metal material can be removed in a relatively short time. In addition, the increase in cutting load can be avoided.

REFERENCE SIGNS LIST

Figure 1:
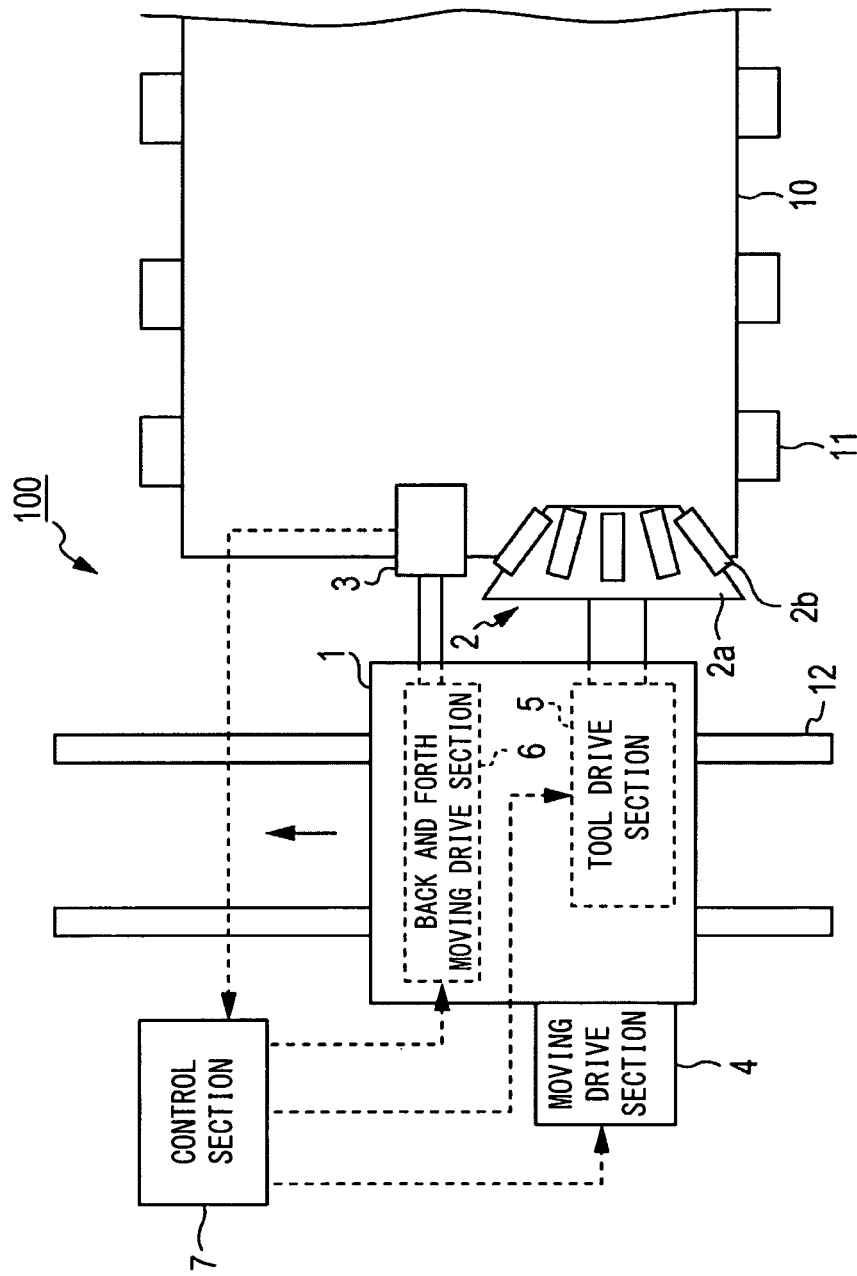
FIG. 1 is a plan view schematically showing a cutting apparatus for a slab edge that implements a slab end adhesive matter cutting and removing method according to a first example.

1 body
2 tool
2*a* tool body
2*b* cutting tip 3 laser distance meter
4 moving drive section
5 tool drive section
6 back and forth moving drive section
7 control section
10 slab
11 table roller
12 rail
13 adhesive matter
100 cutting apparatus for slab edge

DETAILED DESCRIPTION

Examples will now be described with reference to the drawings.

First Example

Figure 2:
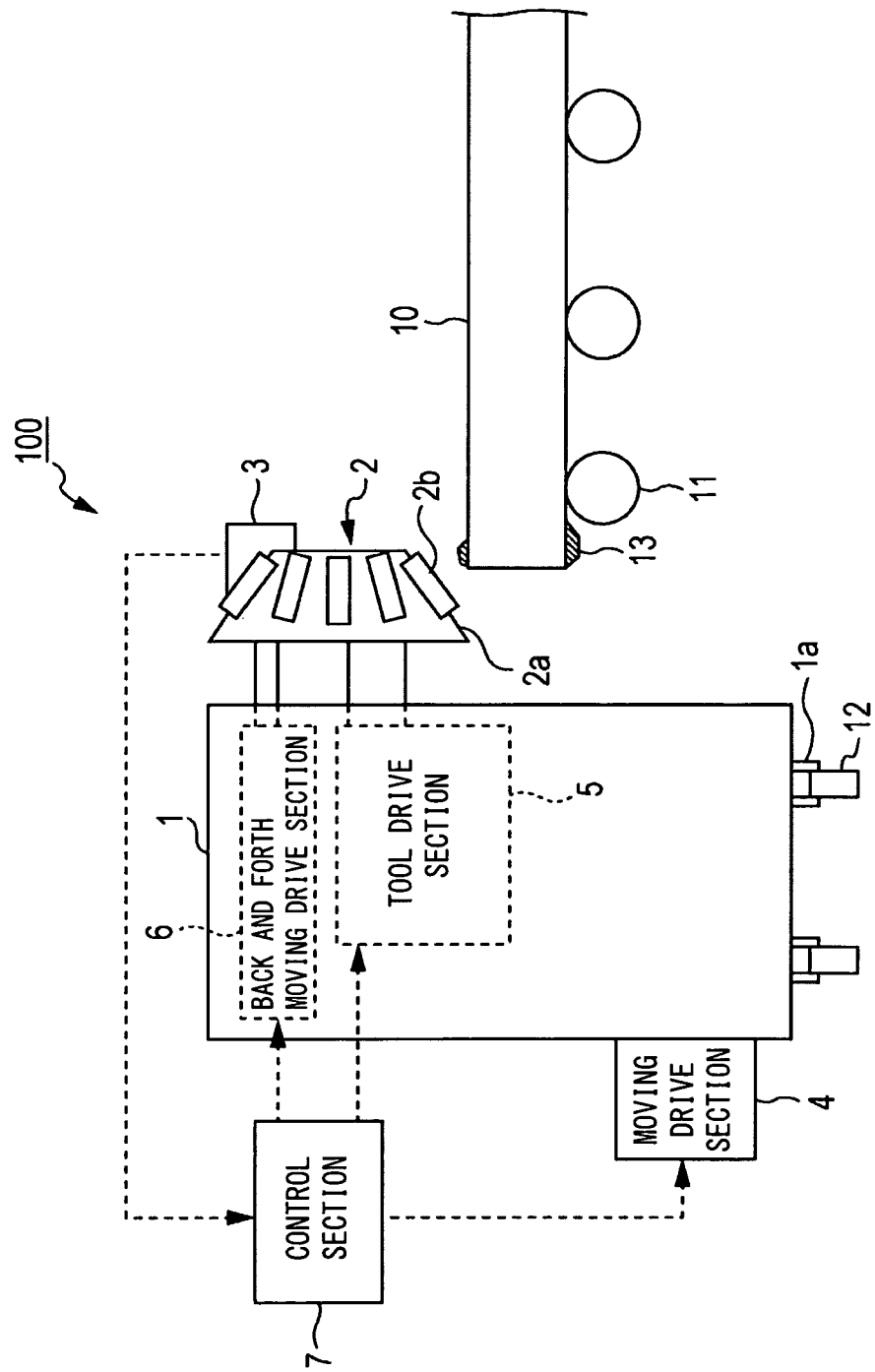
FIG. 2 is a side view schematically showing a cutting apparatus for a slab edge that implements a slab end adhesive matter cutting and removing method according to a first example.

FIG. 1 is a plan view schematically showing a slab end adhesive matter cutting and removing apparatus (hereinafter also referred to as a cutting apparatus for slab edge) that implements a slab end adhesive matter cutting and removing method according to a first example, and FIG. 2 is a side view thereof.

The cutting apparatus 100 for slab edge removes adhesive matter 13 remaining at the end of a slab 10 manufactured by continuous casting and cut by oxygen cutting. The cutting apparatus 100 for slab edge includes a body 1 that moves on rails 12, a tool 2 rotatably provided on the body 1, a laser distance meter 3 provided on the body 1 movably back and forth, a moving drive section 4 that moves the body 1, a tool drive section 5 that changes the vertical position and anteroposterior position of the tool 2 and rotates the tool 2, a back and forth moving drive section 6 that moves the laser distance meter 3 back and forth, and a control section 7. Reference sign 11 denotes a table roller that conveys the slab 10. The tool 2 corresponds to a cutting tool, the laser distance meter 3 corresponds to a distance measurement means, and the control section 7 corresponds to a control means/controller.

The body 1 has wheels 1a, the moving drive section 4 rotates the wheels 1a, and the body 1 thereby moves on the rails 12 in the direction of the arrow of FIG. 1.

The tool 2 is rotated by the tool drive section 5, thereby performing the corner removing cutting (also referred to as chamfer cutting) of the upper and lower surfaces of the end of the slab 10 to remove the adhesive matter 13 adhering to the upper and lower surfaces of the end of the slab 10. The tool 2 may be any tool such as a milling cutter, capable of cutting. In this example, a tool having a truncated cone-shaped tool body 2a and a plurality of cutting tips 2b provided on the conical surface of the tool body 2a is shown as an example of the tool 2. Scarfing slag that, when a cast slab is cut into slabs by oxygen cutting, adheres to the upper and lower surfaces of the slab end is shown as an example of the adhesive matter 13. The tool drive section 5 can, not only rotate the tool 2, but also adjust the vertical position and anteroposterior position of the tool 2. Cutting processing using a grinder or the like has a problem that the amount of cutting per cutting pass is small, therefore cutting takes time, the rate of wear of the whetstone caused by cutting is high, and the life of the whetstone is short. On the other hand, processing by cutting using a milling cutter or the like has an advantage that the amount of cutting per cutting pass can be increased, therefore the processing capacity is large compared to grinding processing, and, not only that, the life of cutting tips is long.

Figure 3:
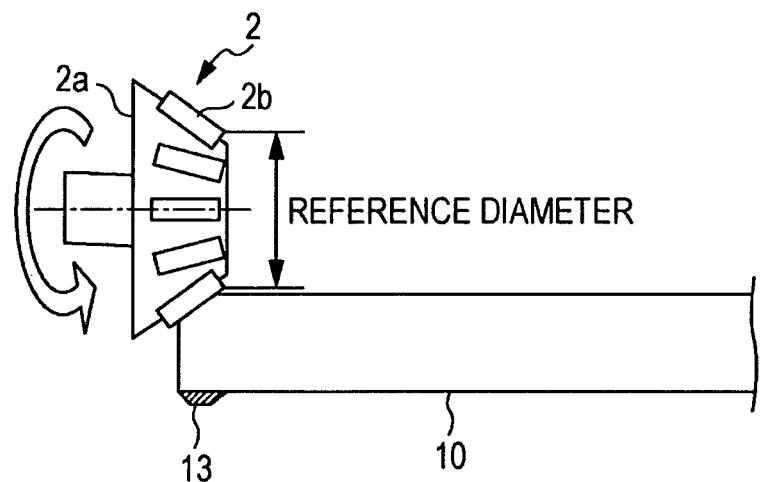
FIG. 3 is a schematic diagram showing a state where the corner removing cutting of the end of the upper surface of a slab is performed using a truncated cone-shaped tool.

When performing the corner removing cutting of the upper and lower surfaces of the end of the slab 10 using the tool 2 to cut and remove the adhesive matter 13, the body 1 is moved in the width direction of the slab 10 while the tool 2 is rotated with the cutting tips 2b of the tool 2 in contact with the end (corner part) of the slab 10 as shown in FIG. 3. The end (corner part) of the slab 10 is thereby cut like a shaving, that is, in a state where the formed chip is continuous. The shape of the part cut and removed by the tool 2 at this time can be adjusted by adjusting the vertical position and anteroposterior position of the tool 2 individually or at the same time using the tool drive section 5. The angle of the part that is cut and removed can also be adjusted by changing the angle of the conical part of the tool 2, or making the angle of the tool 2 changeable by the tool drive section 5. The position of the tool 2 when cutting the upper surface of the end of the slab 10 and the position of the tool 2 when cutting the lower surface of the end of the slab 10 can be switched by the vertical drive of the tool drive section 5.

Figure 4:
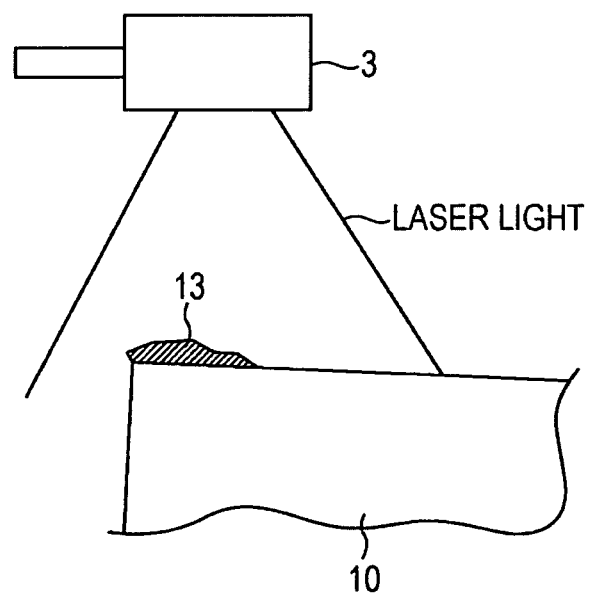
FIG. 4 is a schematic diagram showing a state where the distance to the slab upper surface to which scarfing slag that is adhesive matter is adhering is measured using a laser distance meter.

The laser distance meter 3 is a two-dimensional laser distance meter and measures the distance to the upper surface of the slab 10 by irradiating the slab 10 with laser light as shown in FIG. 4. When adhesive matter 13 exists on the upper surface, the distance to the upper surface of the adhesive matter 13 is measured. The reference position of distance measurement may be the laser emitting position of the laser distance meter 3 or may be a predetermined position of the apparatus 100. The laser distance meter 3 can be moved back and forth by the back and forth moving drive section 6, and can measure the distance to the upper surface of the slab 10 along the longitudinal direction of the slab 10. In this example, the laser distance meter 3 is disposed in front of the tool 2 that performs cutting in the moving direction of the tool, and is capable of moving with the movement of the body 1 together with the tool 2 in the width direction of the slab 10. Although not shown, the same two-dimensional laser distance meter is disposed on the lower side of the slab 10. The laser distance meter 3 may move separately from the body 1. However, it is simple and preferable that the laser distance meter 3 be movable in the width direction of the slab 10 together with the body 1 as in this example.

The control section 7 controls the movement of the laser distance meter 3, and controls the cutting operation by the tool 2. That is, the control section 7 moves the laser distance meter 3 in the longitudinal direction of the slab using the back and forth moving drive section 6 while emitting laser from the laser distance meter 3, measures the distance to the upper surface or the lower surface of the slab, and thereby detects the adhesive matter 13. Then, the control section 7 moves the laser distance meter 3 at a predetermined pitch in the width direction of the slab using the moving drive section 4. At each position in the width direction, similarly, the control section 7 moves the laser distance meter 3 in the longitudinal direction of the slab and measures the distance to the upper surface of the slab 10. The state of adhesion of the adhesive matter 13 on the upper and lower surfaces of the end of the slab 10 can be thereby comprehended. At this time, the measurement pitch in the width direction of the slab of the laser distance meter 3 is preferably several centimeters or less so that the adhesive matter 13 can be reliably detected. On the basis of the thus obtained state of adhesion of the adhesive matter 13 on the upper and lower surfaces of the end of the slab 10, the control section 7 instructs the tool drive section 5 so that the tool 2 can cut the end of the slab 10 in such a shape that the adhesive matter 13 can be completely removed and the decrease in yield rate is minimized. The tool drive section 5 adjusts the vertical position, the anteroposterior position and, in some cases, the angle of the tool 2.

Next, an adhesive matter cutting and removing method using the thus configured cutting apparatus 100 for slab edge will be described. The following method is implemented under the control of the control section 7.

Figure 5:
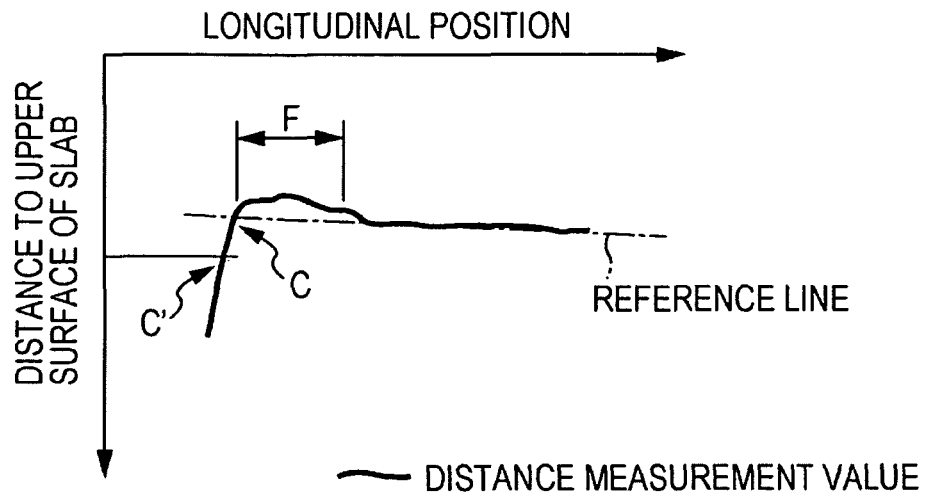
FIG. 5 is a diagram showing an example of distance data measured using the laser distance meter.

First, the state of remaining of the adhesive matter 13 on the upper and lower surfaces of the slab 10 is comprehended. Specifically, the state of remaining of the adhesive matter 13 is obtained by, in a predetermined position in the width direction of the slab 10, moving the laser distance meter 3 in the longitudinal direction of the slab using the back and forth moving drive section 6 and measuring the distance to the upper surface of the slab 10. FIG. 5 shows the distance data of the upper surface of the slab at that time. The distance data of the lower surface of the slab are similar to FIG. 5.

When comprehending the state of remaining of the adhesive matter 13, first, a reference line of the upper surface or lower surface of the slab is determined. The base metal part of the slab to which adhesive matter 13 does not adhere is almost flat and, therefore, this part can be approximated by a straight line. In this example, this line approximated by a straight line is used as a reference line of the upper surface of the slab. The part to which adhesive matter 13 adheres is nearer than this reference line and shown by a protruded shape. The slab end is often warped in the longitudinal direction, and this reference line is not always a horizontal line.

We examined the state of adhesion of scarfing slag of an actual slab in detail and found that most scarfing slag is adhering in a range of 50 mm from the longitudinal end of the slab in the longitudinal direction of the slab. We also found that parts to which scarfing slag is not adhering and parts to which scarfing slag is adhering are mixed in the width direction of the slab. Therefore, the reference line of the upper surface of the slab may be determined, for example, by performing calculation processing such as least squares method on the distance data group of a part that is 50 mm or more distant from the longitudinal end of the slab in the longitudinal direction of the slab where there is little adhesion of scarfing slag. The data group used to determine the reference line preferably includes a length range of about 50 mm or more in the longitudinal direction of the slab. Therefore, it is preferable to measure the distance using the laser distance meter in a range of about 100 mm or more from the longitudinal end of the slab in the longitudinal direction of the slab. In determining the reference line, the end position C' of the slab used as the starting point of distance measurement may be a longitudinal position where the distance measured by the laser distance meter is a predetermined value, for example, a point the distance of which corresponds to the thickness of the slab (from pass line).

A part nearer than the thus determined reference line by a predetermined value can be determined to be a part where scarfing slag that is adhesive matter remains. About 2 mm is appropriate as a predetermined value in view of the size of scarfing slag and the measurement accuracy of the distance meter.

Next, a corner position of the slab used as a reference position of cutting is determined. As shown in FIG. 5, a corner position C of the slab can be defined as a point where the reference line of the slab and the distance distribution data (distance measurement value) curve intersect. The longitudinal position of the above-described end position C' of the slab used to determine the reference line roughly coincides with the longitudinal position of the longitudinal end position C of the slab used as a reference position of cutting.

Next, on the basis of the above-described measurement data, the distance F of the part where scarfing slag remains from the slab end is obtained.

The above-described determination of a reference line, and the operation of obtaining the distance F of the part where scarfing slag remains from the slab end in the longitudinal direction and the corner position C of the slab are performed while changing positions by a predetermined pitch in the width direction of the slab, and the state of remaining of scarfing slag in the width direction of the slab is comprehended.

Figure 6:
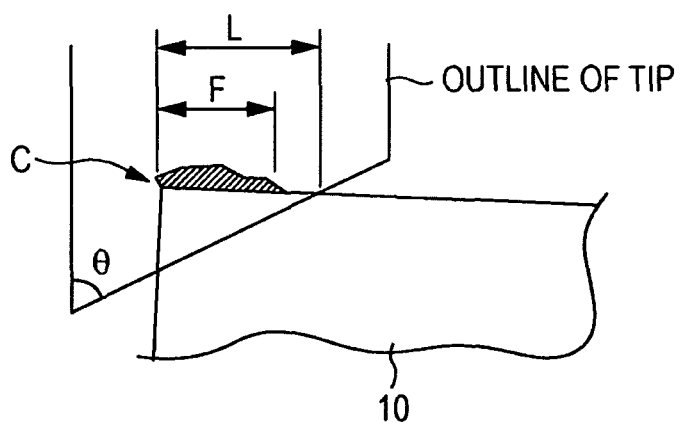
FIG. 6 is a schematic diagram showing the positional relationship between the tool and the slab when cutting the upper surface of the slab.

Then, on the basis of the thus obtained distance F of the part where scarfing slag remains from the slab end and the corner position C of the slab, the amount and position of cutting are determined. The method therefor will be described with reference to FIG. 6. FIG. 6 is a schematic diagram showing the positional relationship between the tool and the slab when cutting the upper surface of the slab. The positional relationship between the tool and the slab when cutting the lower surface of the slab is similar to FIG. 6. As shown in this figure, the amount and position of cutting are determined such that when using the corner position C of the slab as a reference, the cutting length L in the longitudinal direction of the slab is equal to or larger than the adhesion length of scarfing slag (distance F), and the cutting tip position of the tool is set accordingly. In practice, the cutting length L is obtained to be equal to or larger than the maximum adhesion length obtained while changing positions in the width direction of the slab, and the cutting tip position of the tool is determined accordingly.

After determining the cutting tip position of the tool such that the cutting length L is as described above, the tool 2 of the cutting apparatus 100 for slab edge is set at a predetermined position at the slab end. Next, while the body 1 is moved in the width direction of the slab by the moving drive section 4 while the tool 2 is rotated by the tool drive section 5, cutting of the ends of the upper surface and lower surface of the slab 10 is performed. At this time, the angle θ of the cutting tip of the tool (see FIG. 6) can be set within a range of 30° to 80°. If the angle θ is increased, the amount of cutting to remove the scarfing slag adhering to the upper and lower surfaces can be reduced. If θ is too small, the amount of cutting a part other than adhesive matter increases, and the yield rate decreases. On the other hand, if θ is large, the cutting length L is susceptible to the measurement error of the distance from the cutting apparatus 100 for slab edge to the slab end (particularly in the height direction) and the setting error of the tool position (particularly the height position) and, as a result, a difference is likely to arise between the target cutting length and the actual cutting length, and the controllability decreases. Therefore, θ is more preferably 45° to 75°.

In this example, as described above, the distance data to the upper surface and lower surface of the slab end are obtained using the laser distance meter 3, the state of remaining of adhesive matter is comprehended on the basis thereof, and the amount and position of cutting of the slab end are determined on the basis of the state of remaining of adhesive matter. Therefore, adhesive matter adhering to the upper and lower surfaces of the slab can be reliably removed while preventing the decrease in yield rate of the slab. In addition, since adhesive matter is removed by cutting, adhesive matter can be removed in a relatively short time.

Second Example

Next, a second example will be described.

Figure 7:
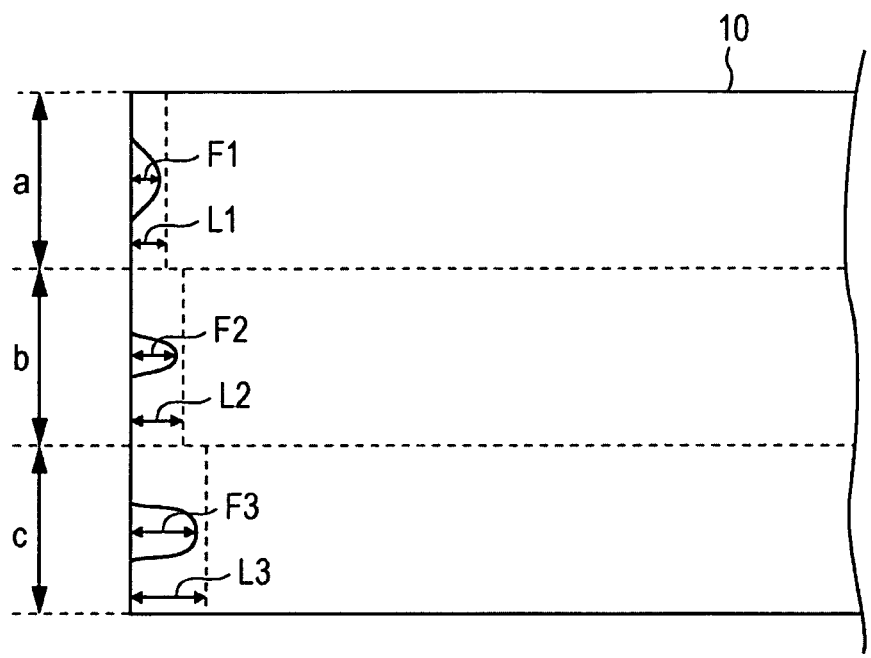
FIG. 7 is a diagram illustrating a slab end adhesive matter cutting and removing method according to a second example.

The adhesion length and height of adhesive matter such as scarfing slag actually vary depending on the position in the width direction of the slab. So, in this example, a slab 10 is divided into a plurality of sections along the width direction, and the cutting length of each section is determined on the basis of the maximum adhesion length of adhesive matter measured in that section. Specifically, for example, as shown in FIG. 7, a slab 10 is divided along the width direction into section a, section b, and section c, the maximum adhesion lengths F1, F2, and F3 of these sections are obtained, a cutting length L1 corresponding to F1 is used in section a, a cutting length L2 corresponding to F2 is used in section b, and a cutting length L3 corresponding to F3 is used in section c. By such a method, the amount of cutting can be minimized, the decrease in yield rate of the slab can be reduced, the damage of the cutting tool can be suppressed, and the running cost can be thereby reduced.

This disclosure is not limited to the two examples described above, and various changes may be made therein.

For example, in the examples described above, a two-dimensional laser distance meter is used to detect adhesive matter at the slab end. However, this disclosure is not so limited, and any measurement means may be used as long as the distribution in the slab longitudinal direction of the distance to the upper surface or lower surface of the slab in the vicinity of the slab end can be comprehended. In the above-described examples, a slab has been described as an example of an object of removing of adhesive matter. However, this disclosure is not so limited, and any other steel material such as a square billet can be an object as long as it is cuboid, and our methods can also be applied to cuboid metal materials other than steel materials. In the above-described examples, a tool having a truncated cone-shaped tool body and a plurality of cutting tips provided on the conical surface of the tool body is used as a tool. However, this disclosure is not so limited as long as the end of a slab or the like can be cut. The moving direction of the body of the cutting apparatus for a slab edge is not limited to one direction, and the body of the cutting apparatus for a slab edge may be made freely movable in the width direction of the slab by changing the attachment position of the laser distance meter or providing a plurality of laser distance meters.

Working Examples

Using the cutting apparatus for slab edge shown in FIGS. 1 and 2, the corner removing cutting of adhesive matter (scarfing slag) remaining on the slab upper and lower surfaces was performed on a plurality of ordinary steel slabs having a thickness of 250 mm, a width of 1200 mm, and a carbon content of 0.14% by mass. The state of adhesion of scarfing slag of the slab to be cut was visually examined in advance and, as a result, the length of scarfing slag adhering to the slab upper and lower surfaces from the slab end was 40 mm at most. A tool used to cut had a reference diameter (the diameter of the smaller base of a truncated cone inscribed in a plurality of cutting tips attached to the tool, see FIG. 3) of 400 mm, and the angle θ shown in FIG. 6 was 70°. The tool was a cutting tool including a plurality of rows of cutting tips disposed in the circumferential direction as shown in FIGS. 1 and 2, and the number of rows was 30. The tool rotation speed in cutting was 150 rpm, and the feed speed in the slab width direction was 4 m/minute.

In Working Example 1, by the method of the first example described above, using the maximum adhesion length of scarfing slag within the full width direction of the slab as the corner removing cutting length, corner removing cutting was performed uniformly in the slab width direction to remove scarfing slag. The measurement of the distance to the slab upper surface (lower surface) to obtain the maximum adhesion length of scarfing slag was performed using a range of 120 mm from the slab corner in the slab longitudinal direction as the target measurement range.

In Working Example 2, in accordance with the second example described above, removal of scarfing slag was performed by a method in which a slab is divided in the width direction of the slab at a pitch of 200 mm into six sections, and, using the maximum adhesion length of scarfing slag measured in that section as the corner removing cutting length in that section, the amount of cutting is changed in order every section in the width direction of the slab. Also in Working Example 2, the measurement of the distance to the slab upper surface (lower surface) was performed using a range of 120 mm from the slab corner in the slab longitudinal direction as the target measurement range.

For comparison, in Comparative Example 1, using the height of a table roller on which a slab is placed plus 250 mm, which is the slab thickness, as the reference height of the slab upper surface, and the height of the table roller as the reference height of the slab lower surface, cutting aimed at achieving an amount of corner removal of 40 mm was performed to remove scarfing slag. In cutting, the slab was conveyed to a predetermined position and was stopped, and the position of a longitudinal end face of the slab facing the cutting apparatus was used as the reference position of corner removing cutting.

Under each of these three conditions, corner removing cutting was performed on ten slabs, the state of removal of scarfing slag was examined, and the damaged state of the tool after cutting was also checked. As a result, in both Working Examples 1 and 2, removal of scarfing slag was reliably performed, and the number of slabs on which scarfing slag remains after cutting was zero. In contrast, in Comparative Example 1, since the exact position and height of the corner part at the slab end and the state of remaining of scarfing slag were not known, scarfing slag remained on four out of ten slabs. As for the cutting tool, in Working Example 1, only slight wear was observed on the cutting tips, and in Working Example 2, no damage such as wear was observed. In contrast, in Comparative Example 1, the wear of cutting tips was significant, and chipping was observed in some tips.

The invention claimed is:

1. A method of removing adhesive matter remaining on upper and lower surfaces of a longitudinal end of a slab by corner removing cutting, comprising:

in a predetermined position in a width position of the slab, moving a distance measurement device in the longitudinal direction of the slab and measuring a distance to the upper surface or the lower surface of the slab;

using a base metal part of the slab to which adhesive matter does not adhere as a reference line of the upper surface and the lower surface of the slab to provide distance distribution data, wherein a part to which adhesive matter adheres is nearer than the reference line of the upper surface or the lower surface of the slab;

determining a corner position of the slab as an intersecting point between the reference line of the slab and a curve of the distance distribution data;

obtaining a distance of the part to which adhesive matter adheres from a slab end in the longitudinal direction and the corner position of the slab;

setting an amount and a position of cutting by the cutting tool by setting a distance to be cut by the cutting tool in the longitudinal direction from the corner position more than or equal to the distance of the part to which adhesive matter adheres; and performing corner-removing cutting on the upper and lower surfaces of the longitudinal end of the slab using the cutting tool in accordance with the determined amount and position of cutting, wherein the cutting tool has a truncated cone-shaped tool body and a plurality of cutting tips provided on a conical surface of the tool body.

2. An apparatus for removing adhesive matter remaining on upper and lower surfaces of a longitudinal end of a slab by corner removing cutting, comprising:

a cutting tool that performs corner removing cutting on the upper and lower surfaces of the longitudinal end of the slab;

a distance measurement device that measures distances of the upper surface and the lower surface of the slab from a reference position; and a controller configured to:

in a predetermined position in a width position of the slab, move the distance measurement device in the longitudinal direction of the slab and measure a distance to the upper surface or the lower surface of the slab;

use a base metal part of the slab to which adhesive matter does not adhere as a reference line of the upper surface and the lower surface of the slab to provide distance distribution data, wherein a part to which adhesive matter adheres is nearer than the reference line of the upper surface or the lower surface of the slab;

determine a corner position of the slab as an intersecting point between the reference line of the slab and a curve of the distance distribution data;

obtain a distance of the part to which adhesive matter adheres from a slab end in the longitudinal direction and the corner position of the slab;

set an amount and a position of cutting by the cutting tool by setting a distance to be cut by the cutting tool in the longitudinal direction from the corner position to more than or equal to the distance of the part to which adhesive matter adheres; and cause the cutting tool to perform corner-removing cutting on the upper and lower surfaces of the longitudinal end of the slab in accordance with the determined amount and position of cutting, wherein the cutting tool has a truncated cone-shaped tool body and a plurality of cutting tips provided on a conical surface of the tool body.

3. The apparatus according to claim 2, wherein the controller is configured to divide the cuboid metal material in a width direction into a plurality of sections, and the distance to be cut for each of the plurality of sections is determined by the distance of the part to which adhesive matter adheres in each section.

4. The method according to claim 1, wherein the slab is divided in a width direction into a plurality of sections, and the distance to be cut for each of the plurality of sections is determined by the distance of the part to which adhesive matter adheres in each section.

5. The method according to claim 1, wherein the body is moved in the width direction of the slab while the tool is rotated with the cutting tips of the tool in contact with the end of the slab when performing corner removing cutting.

6. The method according to claim 4, wherein the body is moved in the width direction of the slab while the tool is rotated with the cutting tips of the tool in contact with the end of the slab when performing corner removing cutting.

7. The apparatus according to claim 2, wherein the body is moved in the width direction of the slab while the tool is rotated with the cutting tips of the tool in contact with the end of the slab when performing corner removing cutting.

8. The apparatus according to claim 3, wherein the body is moved in the width direction of the slab while the tool is rotated with the cutting tips of the tool in contact with the end of the slab when performing corner removing cutting.

* * * * *

UNITED STATES PATENT AND TRADEMARK OFFICE
CERTIFICATE OF CORRECTION

PATENT NO. : 10,391,573 B2
APPLICATION NO. : 14/392254
DATED : August 27, 2019
INVENTOR(S) : Kojo et al.

It is certified that error appears in the above-identified patent and that said Letters Patent is hereby corrected as shown below:

In the Claims

At Column 11, at Line 10, please insert -- to -- before "more than".

Signed and Sealed this
Eleventh Day of February, 2020

Andrei Iancu
*Director of the United States Patent and Trademark Office*